A. C. ALEXANDER.
METHOD OF REPAIRING DENTAL PLATES.
APPLICATION FILED SEPT. 6, 1912.

1,066,360.

Patented July 1, 1913.

Witnesses
Hugh H. Ott
E. Edmonston Jr.

Inventor
Albert C. Alexander
By Victor J. Evans
Attorney

COLUMBIA PLANOGRAPH CO., WASHINGTON, D. C.

UNITED STATES PATENT OFFICE.

ALBERT C. ALEXANDER, OF KAHOKA, MISSOURI.

METHOD OF REPAIRING DENTAL PLATES.

1,066,360.  Specification of Letters Patent.  Patented July 1, 1913.

Application filed September 6, 1912. Serial No. 718,950.

*To all whom it may concern:*

Be it known that I, ALBERT C. ALEXANDER, a citizen of the United States, residing at Kahoka, in the county of Clark and State of Missouri, have invented new and useful Improvements in Methods of Repairing Dental Plates, of which the following is a specification.

This invention relates to an improved method of repairing dental plates and the object of the invention is to simplify and cheapen the methods now commonly practised.

Further objects of this invention will appear as the following specific description is read in connection with the accompanying drawing, which forms a part of this application, and in which:—

Figure 1:
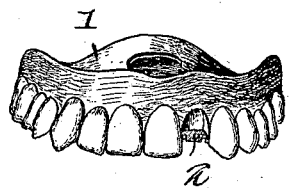
Figure 3:
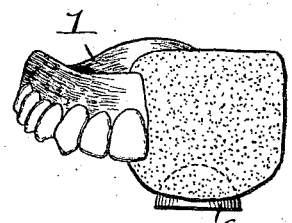
Figure 2:
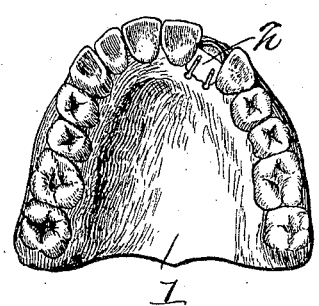
Figure 4:
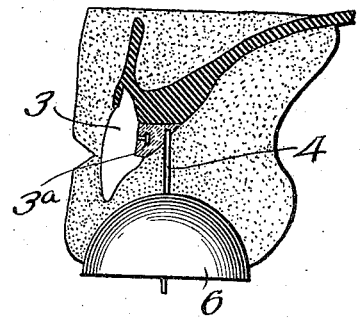
Figure 5:
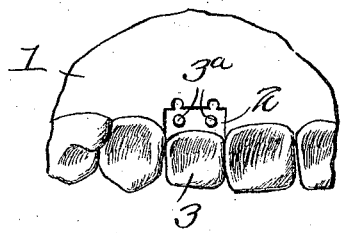
Figure 6:
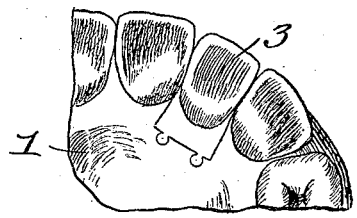
Figure 7:
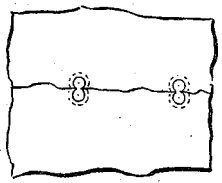

Figure 1 is a front elevation of the plate with a cavity arranged therein to fit the tooth. Fig. 2 is a bottom plan view thereof. Fig. 3 is a front elevation showing the mold applied thereto. Fig. 4 is a section taken through the mold and plate. Fig. 5 is a rear elevation with one half of the mold removed. Fig. 6 is a bottom plan view showing the completed connection. Fig. 7 is a similar view showing the method for connecting two parts of a broken plate.

In carrying out the method, the plate 1 is formed with a cavity 2 preferably retentive in shape and the tooth 3 placed in position on the plate and provided, as is usual, with retaining pins 3 projecting into the cavity. The cavity is then filled with wax or other similar material and a small pin stuck into the same, as shown in Fig. 4. A mass of plaster-of-Paris is then molded around the plate and over the tooth to be attached thereto, which after hardening is provided with a weakening kerf or notch adjacent the top edge of the teeth in the plate so that the lower portion of the plaster-of-Paris mass may be broken away from the plate, as shown. Before breaking this lower portion of the mold away from the teeth and before the same hardens thoroughly, a cup 6 of aluminum or any other suitable material is pressed into the lower part of the mold, said cup being provided with an aperture in its bottom to receive the pin 4. After the lower portion of the mold has been removed, the wax is removed from the cavity and the cavity thoroughly cleaned. The lower portion of the mold is then replaced and a quantity of some low fusing metal is poured into the cup in the molten state and forced by pressure through the aperture in the bottom thereof into the cavity. The metal flows into the retentive portions of the cavity and around the pins on the teeth and when cool, effectually locks the tooth in position upon the plate. When the metal has cooled sufficiently to harden, the lower portion of the mold is removed and the metal portion broken off, as shown in Fig. 6. This operation can be carried out in approximately fifteen or twenty minutes and is more durable than when the tooth is secured in position by revulcanizing a portion of the plate. In Fig. 6, a broken plate is shown connected together by fused metal poured into dovetailed cavities formed on either side of the brace.

What is claimed is:—

The method of connecting teeth to dental plates which consists in forming a cavity adjacent the tooth to be connected, filling the same with wax or similar material, molding a plastic substance over the tooth and around adjoining portions of the plate, removing a portion of the mold, taking the wax from the cavity, replacing the removed portion of the mold, and flowing a metal into the cavity and around the devices upon the tooth.

In testimony whereof I affix my signature in presence of two witnesses.

ALBERT C. ALEXANDER.

Witnesses:
 FREDK. LANG,
 ADAM LANG.

Copies of this patent may be obtained for five cents each, by addressing the "Commissioner of Patents Washington, D. C."